(12) United States Patent
Dotson et al.

(10) Patent No.: US 9,302,425 B1
(45) Date of Patent: Apr. 5, 2016

(54) METHOD AND APPARATUS FOR EDGE SEALING OF FOAM BOARDS

(71) Applicant: Simonton Building Products LLC, Parkersburg, WV (US)

(72) Inventors: Harold E. Dotson, Torch, OH (US); Charles H. Detamore, Elizabeth, WV (US); Clarence B. White, Mineral Wells, WV (US); Charles E. Scott, Parkersburg, WV (US)

(73) Assignee: Simonton Building Products LLC, Parkersburg, WV (US)

( * ) Notice: Subject to any disclaimer, the term of this patent is extended or adjusted under 35 U.S.C. 154(b) by 291 days.

(21) Appl. No.: 13/924,012

(22) Filed: Jun. 21, 2013

Related U.S. Application Data (60) Provisional application No. 61/663,109, filed on Jun. 22, 2012.

(51) Int. Cl.
*B29C 67/20* (2006.01)
*B29C 65/24* (2006.01)

(52) U.S. Cl.
CPC ................... *B29C 65/245* (2013.01)

(58) Field of Classification Search
CPC ................................ B29C 65/245
See application file for complete search history.

(56) References Cited

U.S. PATENT DOCUMENTS

| | | | | |
|---|---|---|---|---|
| 3,189,729 A | * | 6/1965 | Lusebrink | D06C 15/02 100/330 |
| 3,697,205 A | * | 10/1972 | Ross | B29C 44/306 425/122 |
| 8,333,582 B2 | | 12/2012 | Kidwell et al. | |
| 8,377,357 B2 | | 2/2013 | Hartmann et al. | |
| 2006/0233990 A1 | * | 10/2006 | Humphrey | A61L 27/16 428/36.9 |
| 2007/0023953 A1 | * | 2/2007 | Hartmann | B29C 44/56 264/176.1 |
| 2010/0213633 A1 | * | 8/2010 | Kidwell | B29C 67/00 264/175 |
| 2013/0099416 A1 | | 4/2013 | Kidwell et al. | |

* cited by examiner

*Primary Examiner* — Galen Hauth
(74) *Attorney, Agent, or Firm* — Lathrop & Gage LLP (57) ABSTRACT

A method and apparatus for sealing a cut edge of a foam board is disclosed. The foam board has a top surface, a bottom surface, a first cut edge and a second cut edge. Each cut edge extends between the top and bottom surface. The method includes heating of at least one of cut edges to raise the surface to a first temperature, applying pressure to the at least one of the cut edges by a pressure source at a first pressure, and cooling the at least one of the cut edges to a second temperature. The first temperature is above the foam glass transition temperature and the second temperature is below the glass transition temperature.

6 Claims, 8 Drawing Sheets

METHOD AND APPARATUS FOR EDGE SEALING OF FOAM BOARDS

CROSS-REFERENCE TO RELATED APPLICATION

This application claims the benefit of and priority to U.S. Provisional Patent Application Ser. No. 61/663,109, entitled METHOD AND APPARATUS FOR EDGE SEALING OF BOARDS and filed Jun. 22, 2012, the entire disclosure is incorporated herein by reference, to the extent that it is not conflicting with the present application.

BACKGROUND

Foam boards are used in the manufacturing of residential and commercial construction materials. Exemplary applications include exterior trim components, such as door trim and window trim. These types of foam board products typically are finished to have the ornamental quality of lumber, and can be cut to size for specific applications.

Polyvinylchloride (PVC) foam boards with cellular structure are one type of foam board. Individual PVC foam boards are cut from large sheets of foam material. The large sheets are formed in an extruding process and have a smooth outer surface in which the cellular structure of the foam is not apparent. When the large sheets are cut to produce the foam boards, the resulting cut edges of the boards have exposed cellular structure. As a result, the cut edges of the boards are visually different from the top and bottom faces of the boards. The cut edges also collect dirt more readily than the top and bottom faces of the boards.

To minimize these and other effects of foam board cutting, all sides of a board may be painted to seal the edges and negate differences between the cut edges and the top and bottom faces. However, painting adds cost and time to foam board manufacturing or to on-site construction.

SUMMARY

In an exemplary embodiment of the invention, a method for sealing edges of a foam board constructed from a foam sheet is disclosed. The foam board has a top surface, a bottom surface, a first cut edge and a second cut edge. Each of the cut edges extends between the top surface and the bottom surface. The method includes transporting the foam board in proximity to an indirect heat source at a predetermined speed, heating of at least one of the cut edges to a first temperature, applying pressure to the at least one of the cut edges by a pressure source, and cooling the at least one of the cut edges to a second temperature. The first temperature is above the glass transition temperature of the foam, and the second temperature below the glass transition temperature of the foam. A machine for practicing the inventive method is disclosed.

Further features and advantages of the invention will become apparent from the following detailed description made with reference to the accompanying drawings.

BRIEF DESCRIPTION OF THE DRAWINGS

Features and advantages of the general inventive concepts will become apparent from the following detailed description made with reference to the accompanying drawings.

DETAILED DESCRIPTION

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts.

An apparatus and method for edge sealing of foam boards is disclosed. Exemplary foam boards are die-cut or otherwise separated from typically much larger foam sheets. A foam sheet may be mass produced, either separately or at least partially in-line with the foam board construction, by continuous extrusion of a thermoplastic material. An exemplary thermoplastic is polyvinylchloride (PVC), and PVC will be referenced for discussion purposes, but other thermoplastics, or any type of foam, may be utilized in the practice of the invention. The resulting foam sheets have sealed edges which are consistent in appearance with the top and bottom faces of the foam board. After the foam sheet is cut, the edges are unsealed and inconsistent in appearance. The cut edges are also less smooth and collect dirt more readily as compared to the top and bottom faces of the boards.

In practice of an exemplary method of the invention, a foam board is processed through a series of steps. After extrusion and cutting operations, the foam board has a top surface and a bottom surface that are each smooth and sealed. The cellular structure of the PVC foam is not visually apparent. Further, the top and bottom surfaces are resistant to dirt build-up. The foam board further includes at least two cut edges extending between the top surface and the bottom surface. The cut edges are unsealed and expose the cellular structure of the PVC foam sheet.

The method may include initially an edge preparation process to remove board geometry variations relative to the top and bottom of the board. A surface de-ionizing system is subsequently used to promote dust removal. Other types of pre-process treatments can be used as a substitute or in addition to a surface de-ionizing system in the practice of the invention.

An exemplary embodiment of the invention includes a method having several process steps. The method includes transporting the foam board in proximity to an indirect heat source at a predetermined speed. In indirect heating, the heat source is disposed a distance from the board so that the board does not touch the heat source. The indirect heating process raises the temperature of at least one of the cut edges. Specifically, the edge is raised to a temperature above the glass transition temperature of the foam to weaken the edges to a predetermined depth. An exemplary indirect heat method is medium wave indirect infrared heating from one or more carbon infrared emitters. The heated softened edges of the foam board are then passed through a forming mechanism. Pressure from the forming mechanism closes the open cellular structure of the foam at the edge surface. A cooling mechanism cools the polymer to below the glass transition temperature to maintain this desired closed cell structure. Alternatively, the forming mechanism can perform all or part of the cooling process. The foam board may further cool to room temperature remote from the cooling mechanism, while maintaining any sealed edges extending between the top surface and the bottom surface of the foam board.

Figure 1:
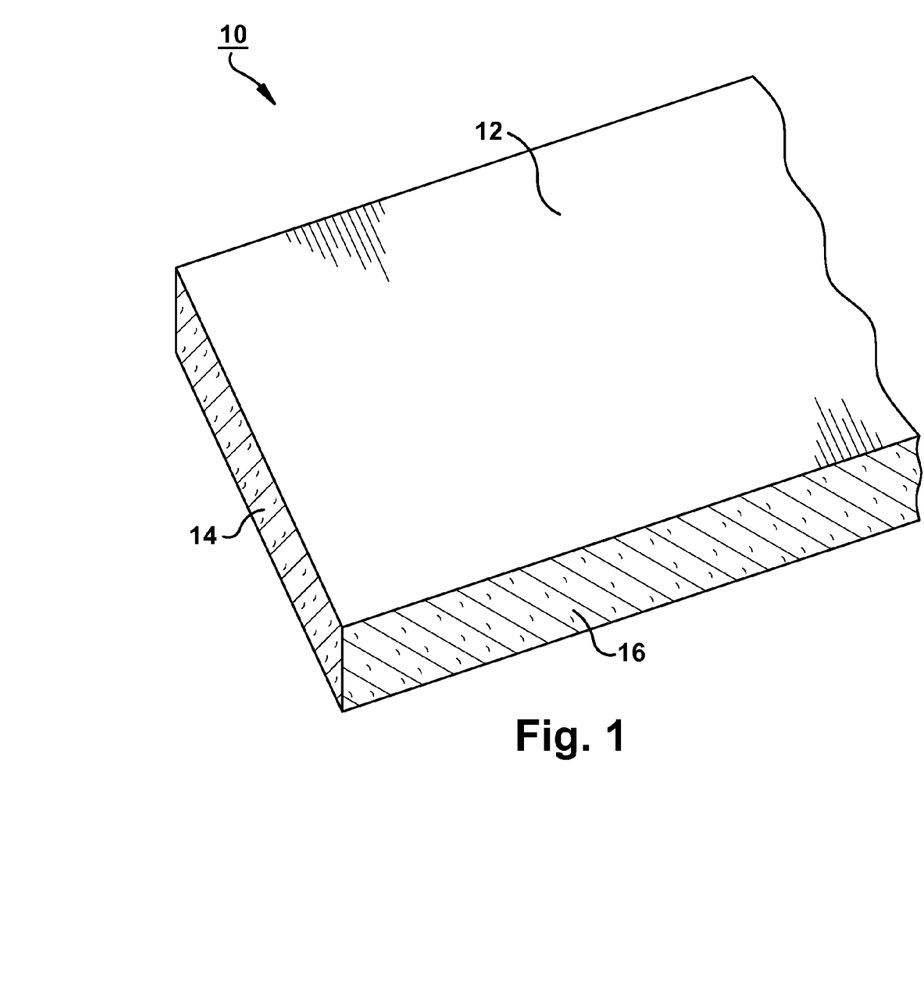
FIG. 1 is a perspective view of a foam board having cut and unsealed edges.

Referring now to the drawings, an exemplary embodiment of the invention will now be discussed. Referring now to FIG. 1, a perspective view of a foam board 10 having cut and unsealed edges is shown. The exemplary foam board 10 has a top surface 12, a bottom surface 13 (see FIG. 5), a leading cut edge 14, a trailing cut edge 15 (see FIG. 8), a first longitudinal cut edge 16 and a second longitudinal cut edge 18 (see FIG. 8). The longitudinal cut edges 16, 18 extend between the top surface 12 and the bottom surface 13. To the touch and to the eye, the top and bottom surfaces 12, 13 are smooth and essentially in the condition in which they left the extruder as part of a foam sheet. However, after a die-cut operation or the like, the four exterior edges 14, 15, 16, 18 expose the cellular structure of the foam material, such as for example, PVC. It should be apparent to those with skill in the art, that a rectangle-shaped board 10 is shown for purposes of example only, and that any practical shape, thickness, size or orientation of board may be used in the practice of the invention.

Figure 2:
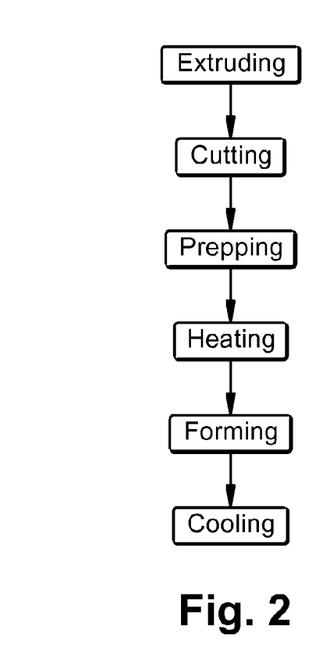
FIG. 2 is a flowchart of method steps, showing an exemplary embodiment of the invention.

A flowchart of an exemplary method embodiment of the invention is shown in FIG. 2. The steps of FIG. 2 will be discussed herein. However, the process shown details steps of an exemplary embodiment and not all illustrated steps are required in the practice of the invention, or in the order illustrated. Also, other process steps may be added in the practice of the invention. Steps may also be performed concurrently. For example, the forming and cooling steps may occur with the same mechanism, partially with the same mechanism and partially with separate mechanisms, or entirely with separate mechanisms.

Figure 3A:
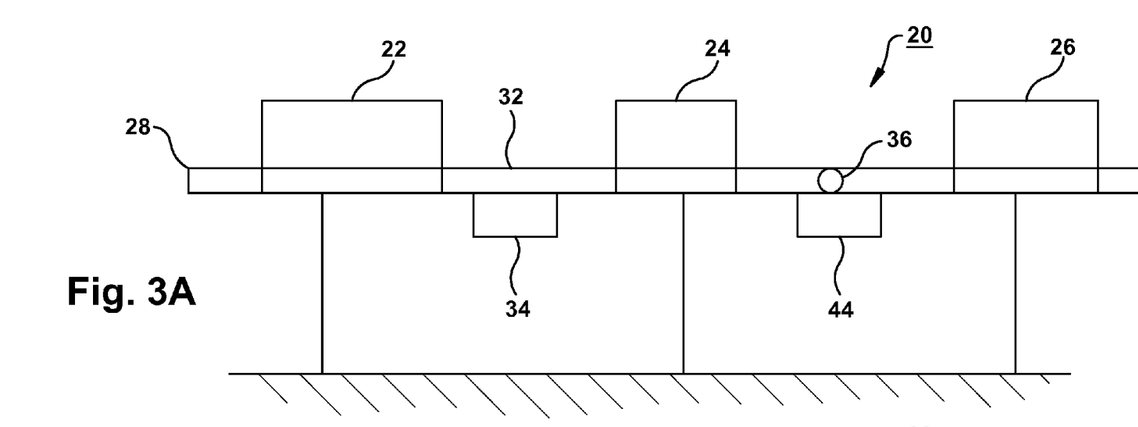
FIG. 3A is a schematic of an exemplary embodiment of the invention, showing a machine having three board processing areas.

FIG. 3A is a front view of an exemplary machine 20 of the invention, showing three board processing areas. An edge preparation processing area 22, a heating processing area 24 and a formation, or pressure and cooling, process area 26 are shown. Foam boards enter the machine at an inlet 28 and proceed through the process areas 22, 24, 26 along a track 32 to an outlet 30. A board transport system includes a plurality of rollers 36 (see FIG. 4, only one roller shown) and a power source 34 capable of processing the board through at least the board processing areas 24, 26 at a predetermined speed. The pre-determined speed of the foam board through the process is dependent on the heating process criteria. In one embodiment, the predetermined speed is between 10 meters per minute and 15 meters minute. In another embodiment, the predetermined speed does not exceed 15 meters per minute. In another embodiment, the predetermined speed is about 12 meters per minute. It would be apparent to one with ordinary skill in the art that any suitable speed may be used in the practice of the invention. A controller 44 is used in the machine for several functions, including the control of the pre-determined speed during operation.

As discussed, the method begins with extruding a foam sheet produced from a thermoplastic material. The foam sheet may be constructed of a free foam. The extruded sheets may be of a width advantageous for producing products of nominal lumber size, such as for example, 8', 10' and 12'. Foam boards are formed from the foam sheet by a die cutting process, or the like, to produce foam boards of nominal lumber size, such as for example, 8', 10' and 12' long, 4" or 6" wide, and ½", ⅝", ¾", 1" or 2" thick. The die cutting exposes the cellular structure of the foam at any cut edge of the foam board.

When foam boards are cut from a foam sheet, the cut edges of the foam board typically have geometric variations. If the cut edge is not square relative to the top and bottom board face, the edge will be more difficult to seal. To correct any variations, an edge preparation device is positioned to square the cut edges of the foam board prior to passing to the heating processing area. This device will correct any edges that are not straight and square. The edge preparation device cuts or routs the foam boards so that the cut edges of the boards are perpendicular to the top and bottom surfaces of the board and straight along their length. Typically, only a small amount of material will be removed from the cut edges to make them straight and square.

An exemplary edge preparation device 22 includes an electric motor rotating at a transporting speed, such as for example, at 16,500 rpm. A gear reduction assembly reduces the cutting shaft rotational speed. For example, a gear reduction assembly operating at a ratio of 1.818 to 1 reduces the cutting shaft speed to 7,333 rpm. A cutter barrel is rotated to achieve a surface speed relative to the foam board surface. For example, a cutter barrel 47.3 mm in diameter can achieve a surface speed of 1090 meters per minute.

After the geometric variations are minimized in the foam board, dirt and plastic dust should be cleaned from the foam board. A static eliminating de-ionizing blower may be used to remove the static charge from the board, and air knives promote removal of the dust and debris that may have accumulated during the edge preparation process. It should be apparent to one with ordinary skill in the art that the edge preparation machines discussed are exemplary, and practice of the invention is not limited to these machines.

Figure 3B:
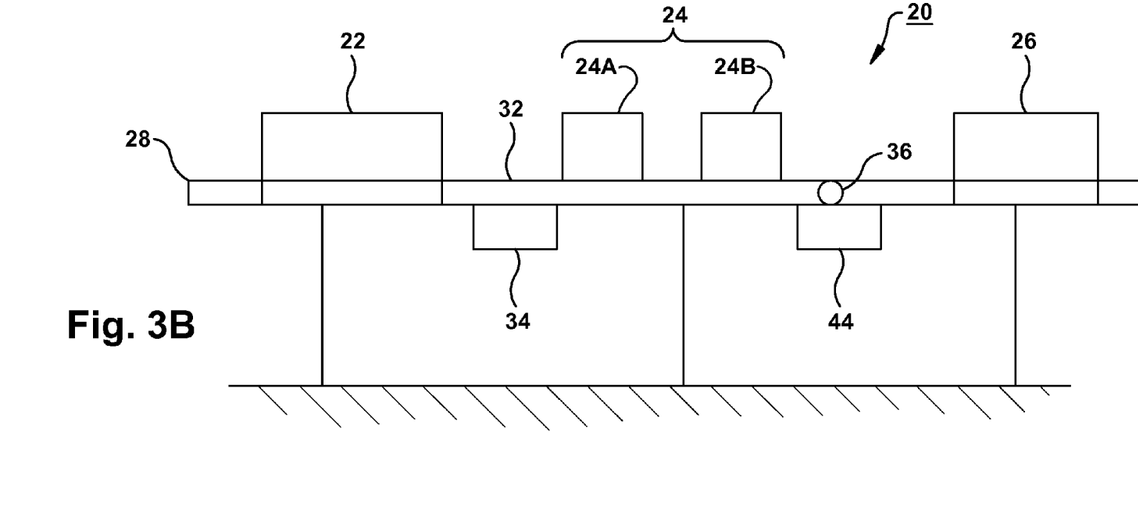
FIG. 3B is a schematic of another exemplary embodiment of the invention, showing a machine having three board processing areas and two heating zones.
Figure 4:
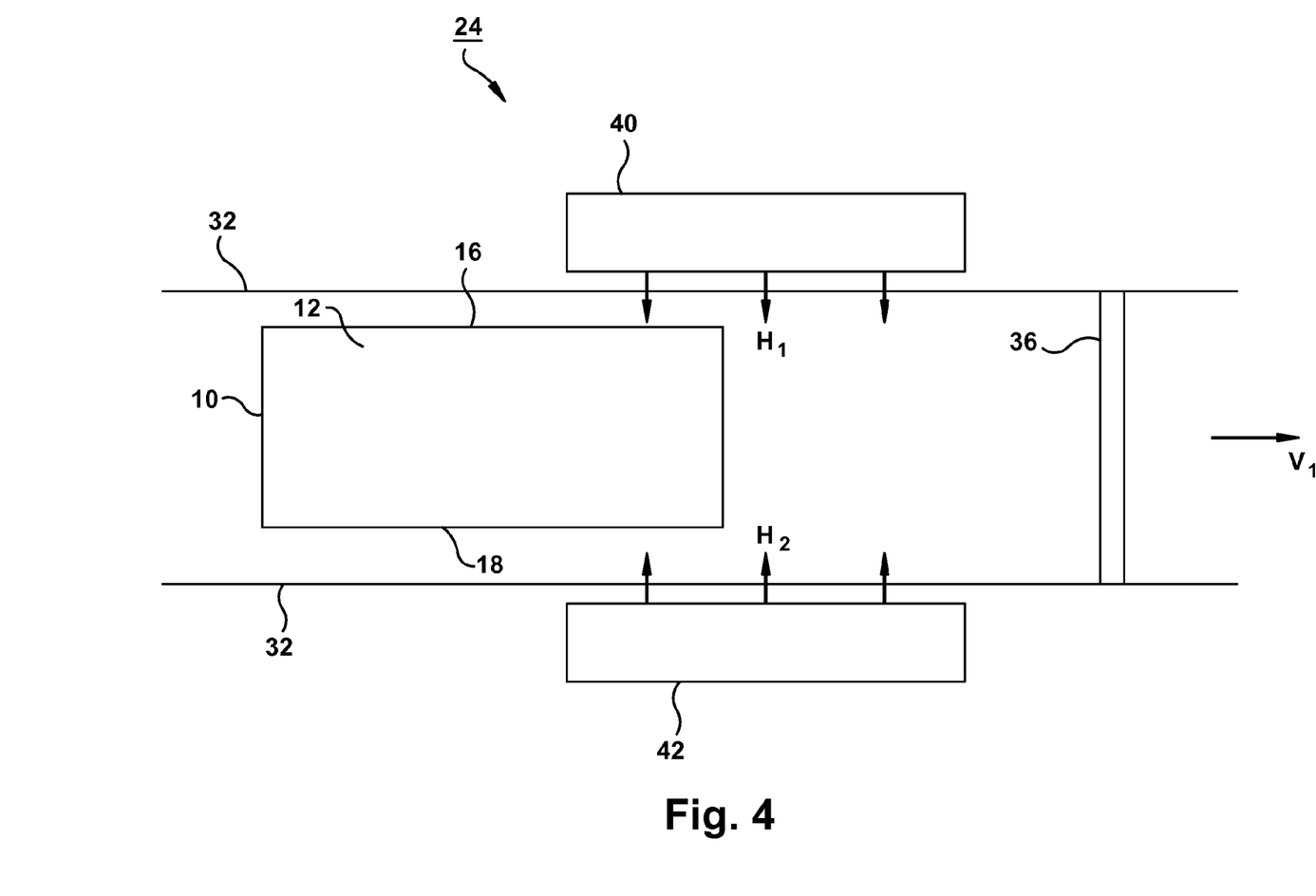
FIG. 4 is a top view of the heating processing area of FIG. 3A.
Figure 5:
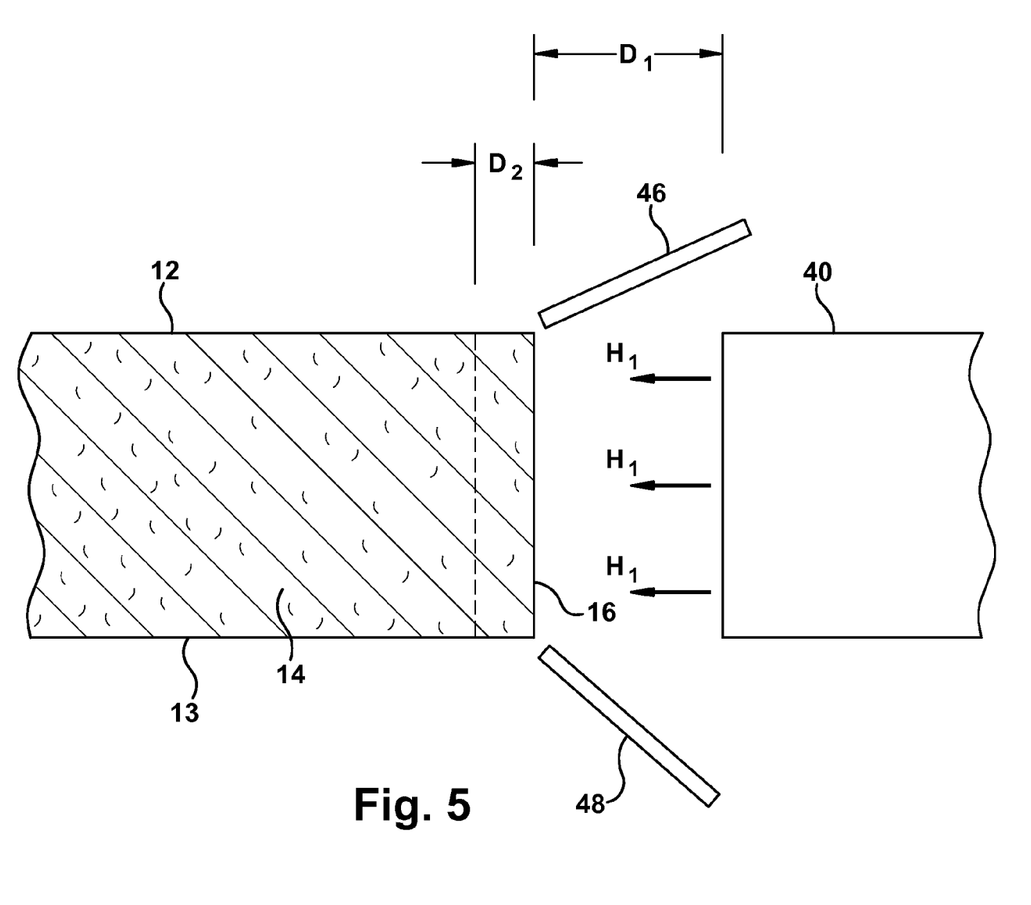
FIG. 5 is a side view of a portion of the heating processing area of FIG. 4.

In the heating processing area, the cut edges of the board are now subjected to an indirect heat source to soften, i.e., weaken, the cellular structure at edge surface of the cut edges. An edge surface is raised to a first temperature above the glass transition temperature of the foam material. As shown in the drawings, FIG. 4 is a top view of the heat processing area 24 of FIG. 3, and FIG. 5 is a side view of a portion of the heat processing area 24 of FIG. 4. In the exemplary embodiment shown in FIGS. 3A and 4, the heat processing area 24 includes one heating zone. In the practice of the invention, the heat processing area may include two or more heating zones, and an individual zone may include one or more heating units. For example, FIG. 3B illustrates a heat processing area 24 having two heating zones 24A, 24B. It would be apparent to one skilled in the art that any number and combination of heating zones and heating units may be used in the practice of the invention.

In an exemplary embodiment of the invention, a foam board enters a heat processing area after being formed and cut. An exemplary heat processing area is illustrated in FIG. 4. The foam board 10 enters the heat processing area 24 at a pre-determined speed $V_1$. The foam board passes in the proximity of indirect heaters 40, 42 along the longitudinal edges 16, 18. The heat sources do not make direct contact with the edges 16, 18. The heaters produce indirect heat in a direction $H_1$, $H_2$ toward the foam board 10.

In the practice of the invention, the type of indirect heat source may vary. In the exemplary embodiment illustrated in FIG. 4, the heaters are carbon infrared emitters 40, 42. Many plastics are advantageously responsive to thermal radiation in the medium wave region. For example, PVC is a particularly good absorber of infrared radiation in the medium wave region.

Indirect heating offers many advantages over conventional direct heaters. An example of indirect heating is carbon infrared emitters. An example of some of the benefits of indirect heating are that wave radiation from an indirect heat source heats the board cut edge evenly, at a high surface power density, at a high efficiency, and at a shorter reaction times at the softening step. Further, because infrared emitters transfer heat in a contact-free manner, the board cannot physically tangle with a direct heat source or otherwise have its linear progress impeded or surface mechanically damaged.

In another exemplary embodiment, LED infrared heating may be used to provide heat the foam boards. An exemplary spectral range for practice of the invention is LED's that cover the 1,600 to 5,000 nm. LED's within this range offer several advantages, including but not limited to, compact size (such as for example, 0.3×0.3 mm/chip), low electrical power consumption (such as for example, 1 mW in pulse mode), high speed response (such as for example, tens per nanoseconds), long life time (such as for example, 100,000 hrs) and low cost. A photo diode heating source would offer similar advantages and may be used in the practice of the invention.

The practice of the invention is not limited to the types, qualities, or criteria of the indirect heat sources discussed herein, and it would be apparent to one skilled in the art that other indirect heat sources could be used in the practice of the invention.

Referring again to FIG. 4, two carbon infrared emitters 40, 42 are shown. As positioned, the rectangle-shaped foam board 10 must be processed through the heating processing area 24 twice to heat all four cut edges 14, 15, 16, 18, if desired. It would be apparent to one skilled in the art that any practical number of heaters can be used in the practice of the invention. Further, the indirect heaters may be positioned, oriented or arranged in any manner suitable to soften one or more cut edges.

FIG. 5 is a side view of a portion of the heat processing area of FIG. 4. As discussed, in an exemplary process a transport mechanism moves the board 10 through the heat processing area at a predetermined speed. A board edge is positioned a distance $D_1$ from the indirect heat source. In the example shown, the first longitudinal cut edge 16 is 10 mm from the carbon infrared emitter 40. The PVC board edge is heated to a first temperature above the glass transition point (73° C.) of the polymer. At the previously mentioned settings, a board surface temperature of 169° C. is sufficient to cause the heat penetration required to soften, or weaken, the PVC board edge to a heat penetration depth $D_2$ as shown in FIG. 5. However, other temperatures above the glass transition temperature may be used in the practice of the invention. This heat penetration is going to be dependent on many factors, such as for example, the number of heating banks used and the speed of the board.

In an exemplary embodiment, one is heating bank on each side of the board and the board moves at a speed of about 12 m/minutes. Further, in the exemplary embodiment, the temperature of the board at a depth greater than the heat penetration depth (e.g., depth>$D_2$) is less than the glass transition point (73° C.). In the embodiment shown in FIG. 5, the heat penetration depth is relatively shallow, for example, less than one millimeter as referenced inward from the first longitudinal edge 16 of the foam board 10; and, in other embodiments, the heat penetration depth may be about one hundred microns. Preferably, the heat penetration is just sufficient to weaken and close a few cells. However, in other embodiments not shown, larger heat penetration depths of, for example, approximately 1-3 mm can be used by adjusting the parameters discussed above.

Shields 46, 48 are positioned, and constructed of a suitable material, to prohibit the top and bottom surfaces 12, 13 from being heated by the indirect heat source 40. As a result, the top and bottom surfaces 12, 13 remain at room temperature during operation of the process. The rollers 36 are also constructed of suitable material to remain essentially at room temperature during operation of the machine. In the practice of the invention, one skilled in the art would recognize that the predetermined speed and first temperature may vary with many factors, including but not limited to, foam material and type of heat source. The distance from the heater to the foam board also may be a contributing factor. In an exemplary embodiment, a range of distance between the heater and the foam board from 5 mm to 15 mm may be used.

Figure 6:
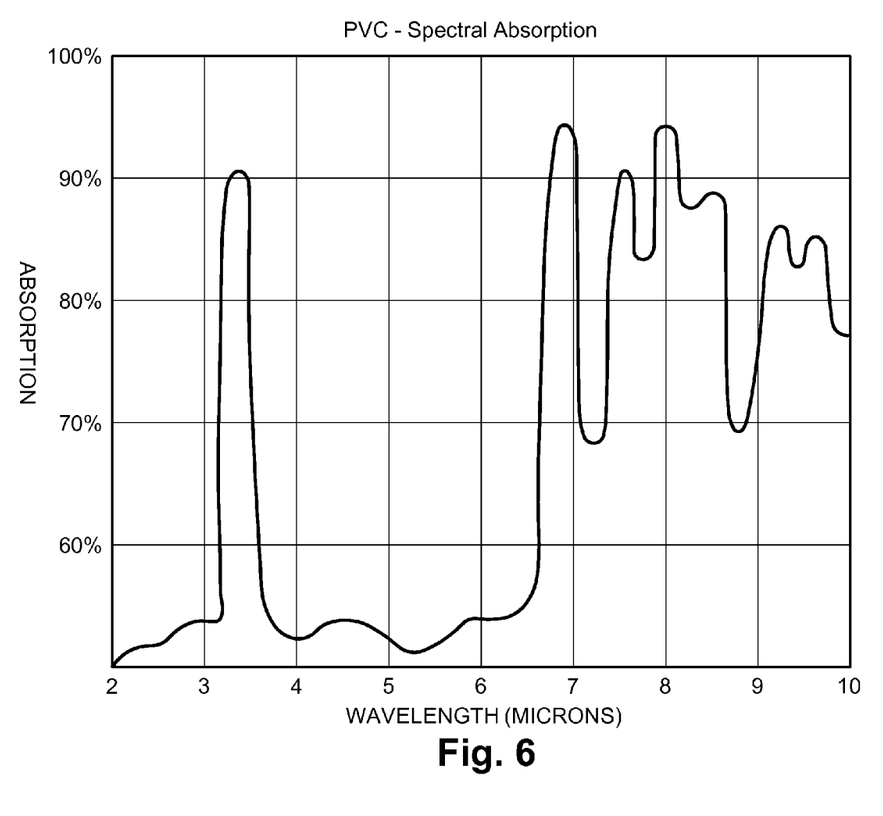
FIG. 6 is graph of the absorption rate of PVC under process infrared heating as a function of light source wavelength.

In another exemplary embodiment of the invention, the predetermined process speed and heating temperature are selected based upon PVC absorption qualities within the process path. FIG. 6 is a graph of the general spectral absorption characteristics of PVC under process infrared heating. As shown in the graph, an infrared heat source producing a spectrum of different wave lengths may be used. In one embodiment, a carbon emitter is used because of the emitter's power, i.e., energy radiated. Carbon emitters allow for predictable and consistent absorption rate by the PVC board. For example, a PVC board heated by a carbon emitter has a predictable and consistent absorption rate when traveling from 9 m/min to 15 m/min, with a power level of 80%, a 10 mm distance from the emitter, and an emitter temperature of 1200° C. Depending upon all process parameters, this predictable and consistent absorption rate could be generated by any emitter that radiates heat at a wavelength that will be absorbed by the target material, in this case PVC. In the practice of the invention, one skilled in the art would recognize that the predetermined spectra of wavelengths may vary with many factors, including but not limited to, foam material and thickness, travel speed and type of heat source.

With a carbon IR emitter using a PVC foam board, a predetermined temperature of 1200° C. of the emitter's surface temperature is selected for a predetermined heat transfer to occur during the process, as measured by PVC absorption. In one embodiment, this predetermined heat transfer rate, along with other predetermined process settings, results in a heat penetration depth of less than one millimeter and, in other embodiments, about one hundred microns. It should be apparent to one skilled in the art that the penetration depth will vary depending on many factors in the practice of the invention, including but not limited to, board speed, heat source temperature, and board thickness.

Figure 7:
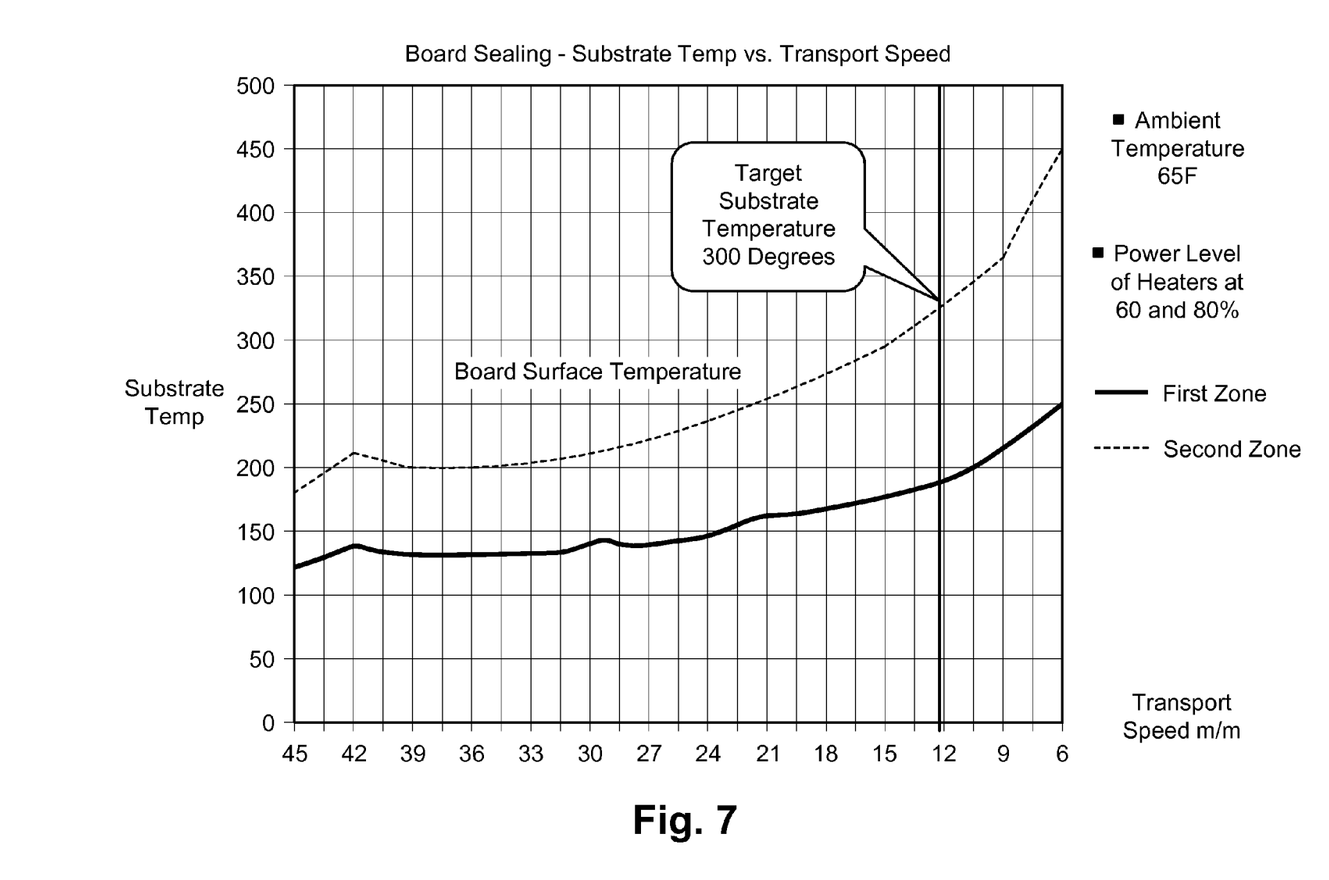
FIG. 7 is a graph of the substrate temperature of a foam board as a function of transport speed, for a foam board transported through an exemplary heating processing area of the invention having two heating zones.

As discussed herein, the heating processing area 24 may include one or more heating zones, such as for example, the heating zones 24A, 24B illustrated in FIG. 3B. Performance characteristic of a foam board, specifically the surface temperature compared to transport speed as transported through an exemplary heating processing area having two heating zones, are graphed in FIG. 7. An exemplary foam board passes through the first zone and the second zone in series. As designated on the graph (in Fahrenheit), the exemplary predetermined target or desired board surface temperature is at least 169° C. after passing through the second zone. At a predetermined board speed of 12 m/min, the foam board has a surface temperature after passing through the first (preheating) zone of about 82° C., and after the second zone, of between 150° C. and 210° C. It would be apparent to one skilled in the art that this ending temperature of the second zone can vary in the practice of the invention, and may be a function of many factors including, but not limited to, transport speed, heater power, distance the board is from the heater, emitter temperature, foam board material, and board thickness.

With the heating process complete, the foam board exits the heating process area with one or more edges that have been weakened and prepared for closing of the cellular structure. Sealing of the cellular structure occurs when the softened edge passes over the forming and cooling mechanisms. The board must travel over the forming and cooling mechanisms at a predetermined speed sufficient to form a seal on the cut edges of the foam board. The predetermined speed may be less, the same, or more than the predetermined speed of the heat processing area.

Keeping the cooling, pressure and board speed variables within desired ranges help to adequately seal the cut edges of foam boards. Controlling the speed and temperature within a range helps to form a smooth edge and to prohibit plastic from sticking to and building up on the forming and cooling mechanisms. Further, controlling the speed and temperature help to reduce flashing from forming on the corners of the board between the top and bottom faces and the edge being sealed. In addition, controlling the temperature and speed of the forming and cooling mechanisms so that they are sufficiently cold and fast will help ensure that the cut edges are adequately sealed. In one embodiment, the speed and temperature combination are controlled such that all portions of the edge are sealed regardless of the diameter of the board material cells.

Figure 8:
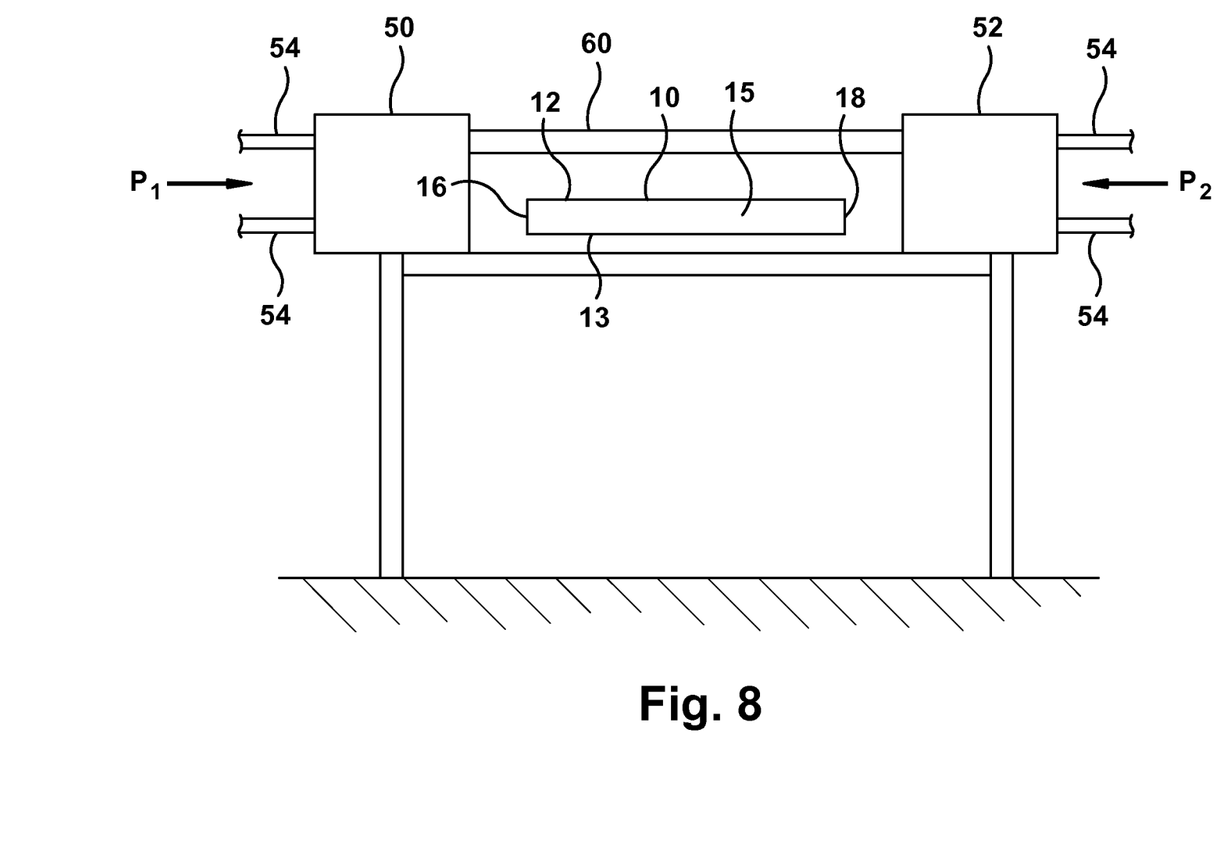
FIG. 8 is a side view of another processing area of FIG. 3A.

FIG. 8 is a side view of the formation, or pressure and cooling, process area 26 of FIG. 3A. A trailing cut edge 15 of the foam board 10 is illustrated between the top surface 12 and bottom surface 13. Two forming blocks 50, 52, or smash blocks, are disposed on either side of the foam board. The controller 44 activates the forming blocks to apply adequate pressure in an inward direction $P_1$, $P_2$ to the first and second longitudinal edges 16, 18 to close the open, and weakened, cells on the surface. The blocks 50, 52 are supported by a rail 60 and arranged to permit slight motion. Although shown separate for clarity, the forming blocks 50, 52 are spaced apart from one another at a distance which is slightly less than the width of the board 10 passing between them. The pressure from the forming blocks closes the open cell structure of the heated plastic, and, little or no material is removed from the board. The width of the foam board 10 is not changed significantly by the forming and cooling processes, even though the processes apply pressure to the cut edges. The spacing between each pair of forming blocks may be adjusted to allow process boards of different widths. In an exemplary process step for PVC boards, a force of 85 psi is applied to the forming blocks by air pressure. In another embodiment, a range of pressure from 75 psi to 95 psi may be used. It should be understood by one with skill in the art that practice of the invention is not limited to the pressures discussed. Further, other pressure sources may be used, and at other pressure levels, in the practice of the invention.

With the edge surface in a closed state, the forming blocks 50, 52 are cooled to lower the edge surface temperature to a second temperature below the glass transition temperature. As shown, cooling water, for example at 16° C., is circulating through the forming blocks by piping 54 to cool the plastic to a second temperature below the glass transition temperature. In one embodiment, the PVC board edge is cooled to a first temperature of 60° C. At this temperature, the memory of the plastic is re-set to maintain the desired and sealed cell structure. One skilled in the art will appreciate that the forming step and cooling step may be accomplished with separate blocks in the practice of the invention. In one embodiment, the cooling time should be of adequate duration to allow the board edge to cool to the same depth as to which it was heated (e.g., the heat penetration depth), which is less than one millimeter in the embodiment shown in FIG. 5 and, in other embodiments, about one hundred microns. In a sealed condition, the edges 16, 18 prohibit the collection of dirt as compared to untreated and cut edges. In another embodiment, the PVC board edge is cooled to a first temperature of 38° C. to prohibit any additional activation of the cellular blowing agent within the board material.

As discussed, the machine 24 utilizes a transport speed control system 44 that utilize variable frequency drive systems to provide infinitely adjustable control of the speed of the board to be edge sealed. An exemplary closed loop temperature control system allows the operator to set desired process temperatures. The control system will hold that temperature regardless of line speeds or other changing process settings. The control panel includes ¼ DIN digital controller with auto tune function for ease of operator setup. The controller displays set value and process value, and has an option for manual control override. The closed loop control input source is a non-contact optical pyrometer that allows monitoring of before and after process values. It should be apparent to others with skill in the art that other controllers can be used in the practice of the invention having different operating features.

In the practice of the invention, either one or both of the forming and cooling processes of the invention may be accomplished by other types of mechanisms, and with the process in a modified or different form, than discussed herein. For example, the cooling process may have two or more phases, in which the foam board is cooled from a heating temperature through a series of cooling steps, with each step having a predetermined temperature or predetermined temperature range. In another exemplary embodiment, instead of smashed blocks, rollers are used against the edge surface of the foam boards. For example, cooling rollers can be used during the cooling process to lower the temperature of the foam board. The cooled rollers may be cooled by any practical method known in the art. A series of coolers at different temperatures may be used. It should be understood by one skilled in the art that the pressure and temperature applied by the rollers may vary in the practice of the invention.

Figure 9:
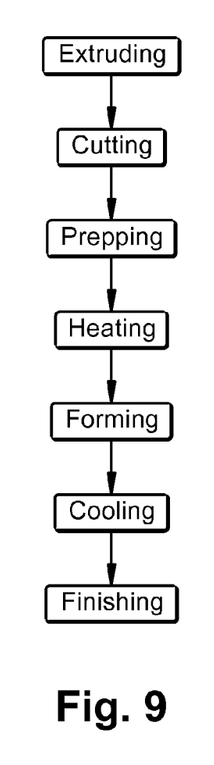
FIG. 9 is a flowchart of method steps, showing another exemplary embodiment of the invention.
Figure 10:
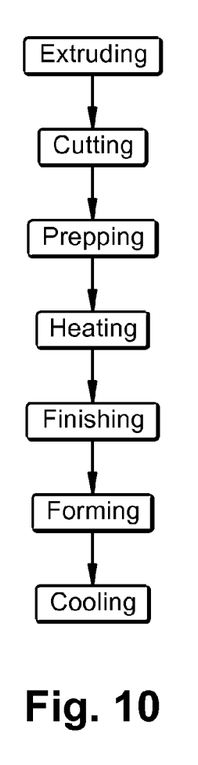
FIG. 10 is a flowchart of method steps, showing another exemplary embodiment of the invention.

As discussed in regard in FIG. 2, the exemplary process steps discussed herein may vary in the practice of the invention. For example, additional process steps may be added, process steps may be deleted, or process steps may be performed in alternative order. FIG. 9 is a flowchart of another exemplary method embodiment of the invention, and shows an example of an added process step, i.e., a finishing step is performed after the cooling step. During a finishing step, the outside surface of the foam board can be treated to change its ornamental appearance. For example, the edges can be deglossed to yield a mat finish. FIG. 10 is a flowchart of another exemplary method embodiment of the invention, and shows an example of an added process step, and the step being performed in an alternative order, i.e., a finishing step is performed after the heating step and before the cooling step. Example finishing steps performed at this step would include the application of a wood grain appearance on one or more of the board's surfaces.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably, connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

Further, while various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A machine for sealing edges of a foam board constructed from a foam sheet, the foam board having a top surface, a bottom surface, a first cut edge and a second cut edge, each of the cut edges extending between the top surface and the bottom surface, the machine comprising:
    a first board processing area including an indirect heat source positioned to radiantly heat at least one of the cut edges to a first temperature above the glass transition temperature of the foam without a thermally conductive element being heated by the indirect heat source and without the thermally conductive element touching the at least one of the cut edges, and shielding structure to reduce heating of the top surface and bottom surface by the indirect heat source, wherein a material of the shielding structure prohibits heating of the top surface and bottom surface;
    a second board processing area including at least one forming device positioned to apply a first pressure to the at least one of the cut edges and at least one cooling device adapted to cool at least one of the cut edges to a second temperature below the glass transition temperature of the foam; and
    a board transport system including a plurality of rollers and a power source capable of processing the board through the first board processing area and the second board processing area at a predetermined speed.

2. The machine of claim 1 wherein the indirect heat source is at least one carbon infrared emitter.

3. The machine of claim 1 wherein the plurality of rollers remain at essentially room temperature during operation of the machine.

4. The machine of claim 1 further comprising a third processing area including an edge preparation device adapted to straighten the first cut edge and second cut edge perpendicular to the top surface and bottom surface of the board.

5. The machine of claim 4 further comprises a static eliminating de-ionizing blower to remove a static charge from the board.

6. The machine of claim 1 wherein the at least one forming device and at least one cooling device comprise a unitary block.

* * * * *